United States Patent
Medulla et al.

(10) Patent No.: US 11,048,567 B1
(45) Date of Patent: Jun. 29, 2021

(54) NOTIFICATION CONTROL SYSTEM AND METHOD OF USE

(71) Applicants: Christen Keithley Medulla, Arlington, TX (US); Michael Jerrod Medulla, Arlington, TX (US)

(72) Inventors: Christen Keithley Medulla, Arlington, TX (US); Michael Jerrod Medulla, Arlington, TX (US)

(*) Notice: Subject to any disclaimer, the term of this patent is extended or adjusted under 35 U.S.C. 154(b) by 0 days.

(21) Appl. No.: 16/710,482

(22) Filed: Dec. 11, 2019

(51) Int. Cl.
G06F 9/54 (2006.01)
G08B 25/01 (2006.01)
G08B 25/00 (2006.01)
G06F 3/0482 (2013.01)

(52) U.S. Cl.
CPC ............ *G06F 9/542* (2013.01); *G06F 3/0482* (2013.01); *G08B 25/008* (2013.01); *G08B 25/016* (2013.01)

(58) Field of Classification Search
CPC .................................................. G06F 3/0482
See application file for complete search history.

(56) References Cited

U.S. PATENT DOCUMENTS

2009/0031340 A1* 1/2009 Modi ............... G08B 27/008
725/33

OTHER PUBLICATIONS

Gil, L., "How to customize notifications on iPhone and iPad" (Aug. 18, 2018), pp. 1-38 [retrieved from https://www.imore.com/how-customize-notification-center-iphone-and-ipad].*
Google, "Control notifications on Android" (Jul. 9, 2019), pp. 1-3 [retrieved from https://web.archive.org/web/20190709121022/https://support.google.com/android/answer/9079661&hl=en], (Year: 2019).*

* cited by examiner

*Primary Examiner* — Brian W Wathen
(74) *Attorney, Agent, or Firm* — Leavitt Eldredge Law Firm; Richard Eldredge; Brandon Leavitt

(57) ABSTRACT

A notification control system includes a handheld computing device; alerts associated with platforms on the computing device, the alerts being associated with notices; a notification management platform accessible from the handheld computing device, and having a selection portal in communication with the platforms; and a settings portal in communication with the selection portal, the settings portal provides options associated with user manipulation of the platforms; a processor working with the notification management platform to perform the steps of: receive a user selection of platforms; and receive a user selection of one or more alerts associated with the one platform; the user selection of one or more alerts designates either activation or deactivation of the alert; the notification management platform provides for user control of the alerts.

4 Claims, 7 Drawing Sheets

NOTIFICATION CONTROL SYSTEM AND METHOD OF USE

BACKGROUND

1. Field of the Invention

The present invention relates generally to mobile device notification systems, and more specifically to a notification control system and method that allows for easy control of notifications and associated alerts for a user of the mobile device.

2. Description of Related Art

Notification systems are well known in the art and are effective means for a user to receive notices from a mobile device, some of which potentially being tied to an audible alert. In FIG. 1, a flowchart 101 depicts a conventional process, wherein the user has a mobile computing device with a plurality of platforms downloaded thereon, as shown with box 103. The various platforms are typically configured to provide alerts to the user, as shown with box 105. The user may at times desire to alter the notification settings, such as when the user is sleeping, at work, or the like, wherein the user will then either turn the entire mobile device to a silent setting, or alternatively navigate to each platform settings and alter the notifications, as shown with box 107.

One of the problems commonly associated with conventional notification systems is the inconvenience associated with making adjustments to which notices are provided to the user. For example, a user may want to always receive text messages from a certain individual, or always receive certain platform notifications, whereas other notices can be silenced during sleep or meetings. Such customized settings are inconvenient for a user to establish.

Accordingly, although great strides have been made in the area of notification systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
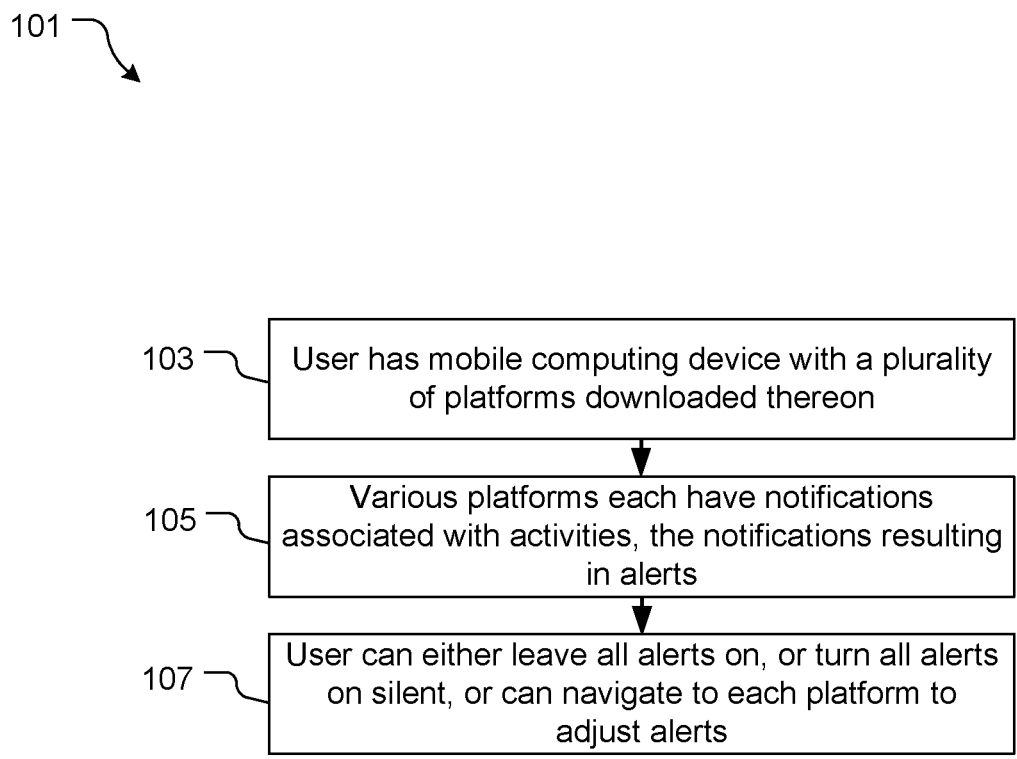
FIG. 1 is a flowchart of a conventional notification method.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional notification systems. Specifically, the present invention provides for a system that allows for quick and easy control of notifications for a plurality of platforms. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
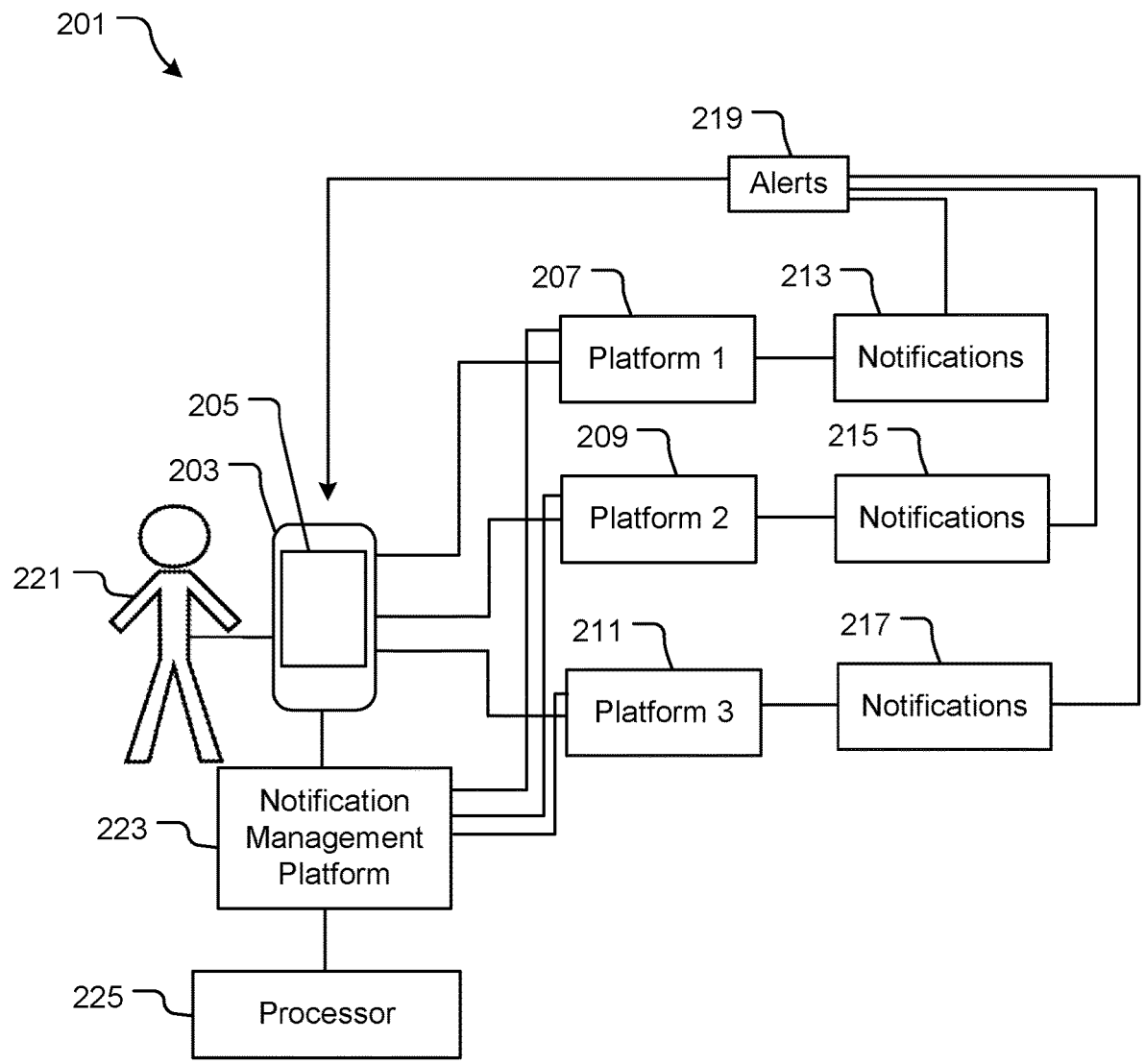
FIG. 2 is a schematic of a notification control system in accordance with the present application.

Referring now to the drawings, FIG. 2 depicts a schematic of a notification control system 201 in accordance with a preferred embodiment of the present application. It should be appreciated that the system of the present invention overcomes one or more of the above listed problems of conventional notification systems.

System 201 includes a mobile computing device 203 with a user interface 205 thereon. The mobile computing device 203 will have one or more platforms 207, 209, 211 contained thereon. The platforms can be associated with third parties, such as social media, security systems, and/or other communication systems. As is common, these platforms include various notifications 213, 215, 217 that may result in alerts 219 being sent to the mobile computing device 203, thereby alerting the user 221 as to an event or the like.

System 201 further includes a notification management platform 223 that works and operates with a processor 225. The notification management platform 223 is configured to work with the one or more platforms discussed above, wherein the notification management platform 223 allows for a user to easily manipulate which notices result in alerts and which do not.

It should be appreciated that one of the unique features believed characteristic of the present application is the notification management platform. This feature allows for the user to quickly access settings associated with the multiple platforms and make adjustments to alerts. For example, the user can designate that all alerts for some platforms are disabled, while all for another platform are enabled. Further, the user may establish settings that set specific times wherein specific platform notifications are enabled, while others are not.

Figure 3:
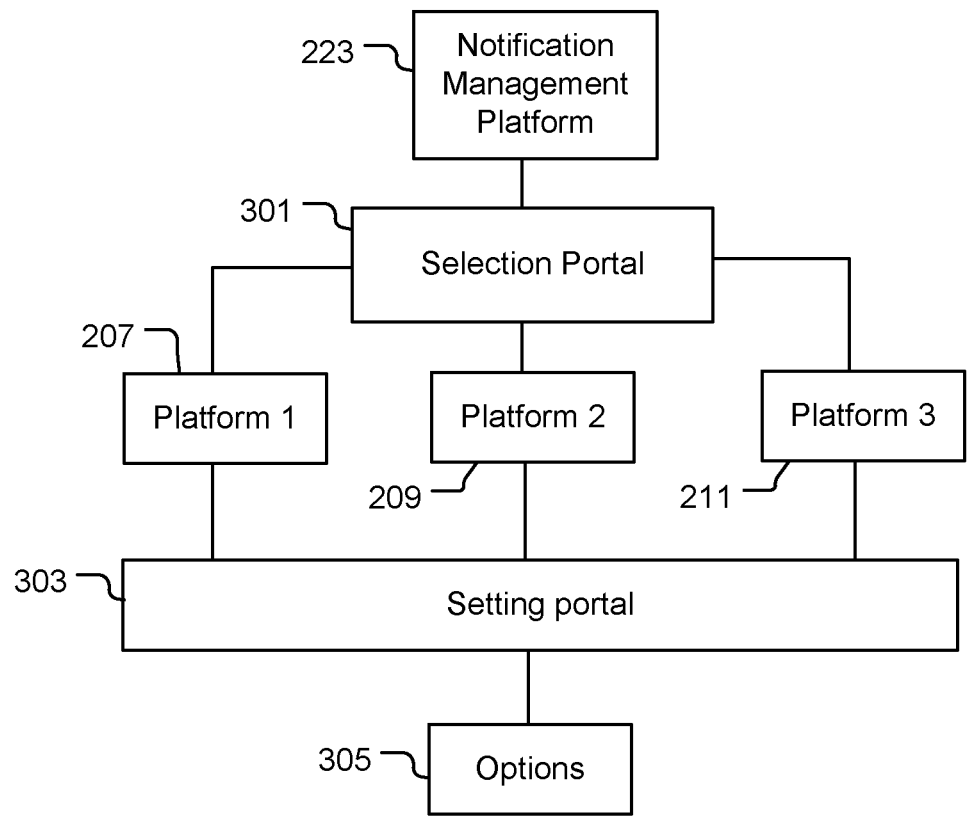
FIG. 3 is a schematic of the use of a notification control platform of FIG. 2.

In FIG. 3, a schematic depicts the interaction between the notification management platform 223 and the other platforms 207, 209, 211. In the preferred embodiment, a selection portal 301 is provided, wherein the user may select one or more platforms to make adjustments on. In some embodiments, it is contemplated that merely selecting a platform, such as through a drag and drop method, results in deactivation or activation of alerts associated with that platform. If the user desires further customize, the user can select one or more of the platforms, wherein a setting portal 303 allows for a user to select one or more options 305. The options including various appropriate options based on the particular platform, such as a selection of specific times for alerts, specific contacts for alerts, or the like.

Figure 4:
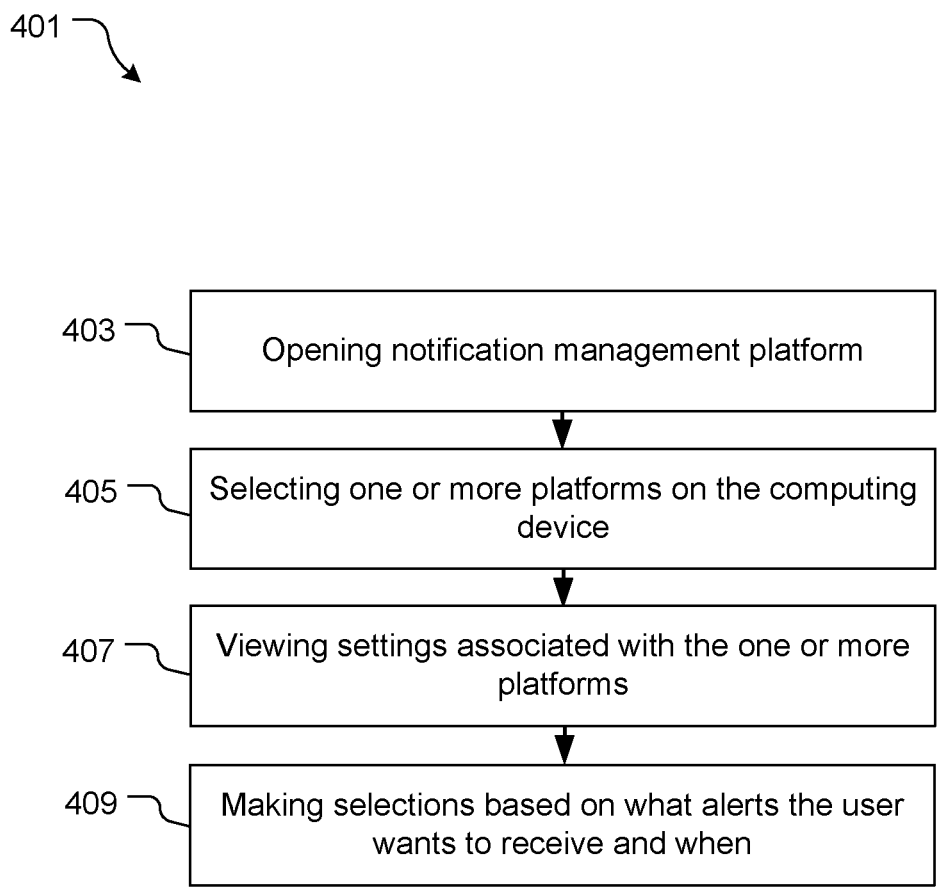
FIG. 4 is a flowchart of the method of use of the system of FIG. 2.

In FIG. 4, a flowchart 401 depicts a method associated with system 201. During use, the user will open the notification management platform, as shown with box 403. The user can then proceed to select one or more platforms that are downloaded on the computing device, as shown with box 405. The user can then use the setting portal to make adjustments to alerts that are sent by the one or more selected platforms, as shown with boxes 407, 409.

Figure 5:
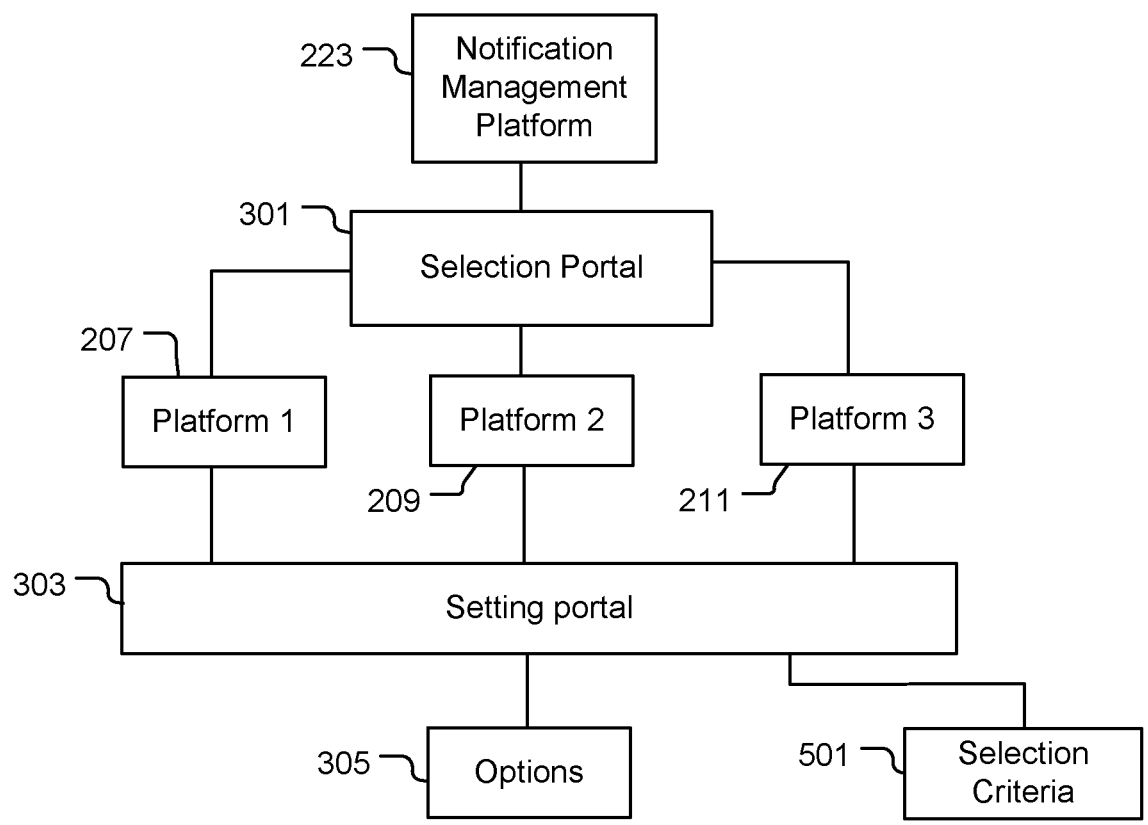
FIG. 5 is a schematic of an alternative use of the control platform of FIG. 2.

In FIG. 5, a schematic depicts the interaction between the notification management platform 223 and the other platforms 207, 209, 211 as disclosed in FIG. 3. In this alternative use, the setting portal 303 includes selection criteria 501 that provides options to the user to allow alerts or notifications under a selected set of conditions.

Figure 6:
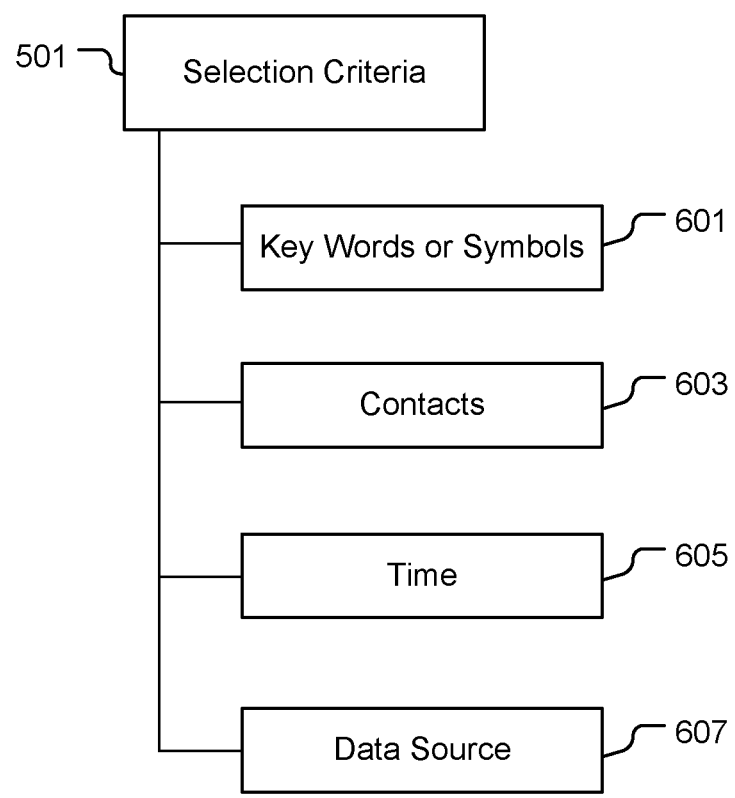
FIG. 6 is a diagram of the selection criteria of FIG. 5.

As further depicted in FIG. 6, the selection criteria 501 include such sources as key words or symbols 601, contacts 603, times or dates 605 or data sources 607. For example, if a notification from a platform includes certain words, the setting portal 303 automatically changes or bypasses the options 305 to allow the notifications to reach the user. Theses sources have been given as examples and not with the intent to limit the scope of the disclosure.

Figure 7:
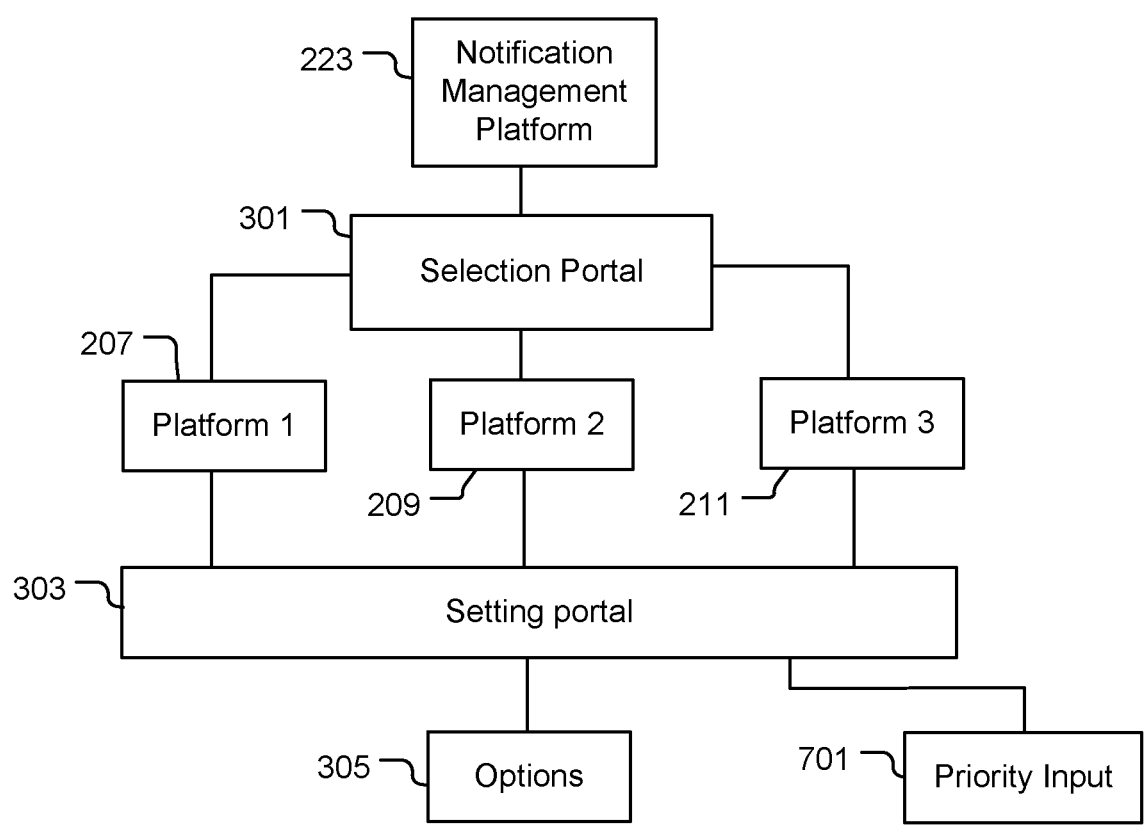
FIG. 7 is a schematic of an alternative use of the control platform of FIG. 5.

Yet another alternative use of the setting portal 303 is depicted by FIG. 7, wherein the interaction between the notification management platform 223 and the other platforms 207, 209, 211 as disclosed in FIG. 3. In this alternative use the setting portal 303 includes data or communication from a priority input is configured to interrupt or bypass the options created by the user. For example, a home security system or child monitor is configured to send information or data relative to the safety of persons or property and that this information or data would direct the setting portal 303 to alter or bypass the options to convey the alter to the user.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A notification control system, comprising:
   a handheld computing device having a user interface;
   a plurality of alerts associated with one or more platforms, each of the plurality of alerts being associated with a notice;
   a notification management platform accessible from the handheld computing device, the notification management platform having:
     a selection portal in communication with the one or more platforms; and
     a settings portal in communication with the selection portal, the settings portal provides one or more options associated with user manipulation of the one or more platforms, the settings portal having a selection criteria consisting of:
       a key word;
       a symbol;
       a contact;
       a time; and
       a data source; and
   a processor working with the notification management platform, the processor configured to perform the steps of:
   receive a user selection of one platform of the one or more platforms; and
   receive a user selection of one or more alerts associated with the one platform;
   wherein the user selection of one or more alerts designates either activation or deactivation of the alert;
   wherein the notification management platform provides for user control of the plurality of alerts; and
   wherein the selection criteria provides option to the user to allow alerts or notifications under a selected set of conditions.

2. The system of claim 1, wherein the setting portal allows for selection criteria for the user to manipulate to allow for the options to be bypassed.

3. The system of claim 1, wherein the setting portal allows for priority data to manipulate and thus allow for the options to be bypassed.

4. A method of notification control of a handheld computing device, the method comprising:
   providing the system of claim 1;
   connecting the notification management platform to the one or more platforms contained on the handheld computing device;
   accessing the selection portal of the notification management platform, the selection portal providing access to the one or more platforms;
   selecting one platform of the one or more platforms; and
   selecting one or more settings from the settings portal of the notification management platform, the one or more settings being in association with one or more alerts of the one platform;

wherein the notification management platform provides for user control of a plurality of alerts.

\* \* \* \* \*